United States Patent [19]

Russ et al.

[11] 4,297,926
[45] Nov. 3, 1981

[54] MACHINE TOOL WITH OFFSET COMPENSATION

[75] Inventors: Peter Russ, Monheim; Heinz Jansen, Cologne, both of Fed. Rep. of Germany

[73] Assignee: Deutsche Industrieanlagen GmbH Werk Hermann Kolb Maschinenfabrik Koeln, Cologne, Fed. Rep. of Germany

[21] Appl. No.: 127,778

[22] Filed: Mar. 6, 1980

[30] Foreign Application Priority Data

Mar. 9, 1979 [DE] Fed. Rep. of Germany ....... 2909227

[51] Int. Cl.³ .......................... B23B 5/18; B24B 5/00
[52] U.S. Cl. .................................... 82/9; 51/237 CS; 51/105 SP
[58] Field of Search ............ 82/9; 51/105 SP, 237 CS

[56] References Cited

U.S. PATENT DOCUMENTS

| 2,484,887 | 10/1949 | Hoier et al. | 51/105 SP |
| 2,651,895 | 9/1953 | Rocks | 51/237 CS |
| 2,733,560 | 2/1956 | Strnad | 82/9 |
| 3,583,108 | 6/1971 | Oishi | 51/237 CS |
| 3,584,423 | 6/1971 | Hoare | 51/105 SP |

Primary Examiner—Harrison L. Hinson
Attorney, Agent, or Firm—Karl H. Gross

[57] ABSTRACT

A machine tool for maching of crankpins on crankshafts, or of similarly trans-axially offset portions of other types of workpieces, includes an arrangement for indexing the workpiece to a plurality of different positions to place new crankpins in position for machining without having to unclamp the workpiece or stop its rotation. Indexing accuracy is greatly improved and all indexing-related operations are powered by the prime mover of the machine tool rather than requiring separate drives.

32 Claims, 6 Drawing Figures

MACHINE TOOL WITH OFFSET COMPENSATION

BACKGROUND OF THE INVENTION

1. Field of the Invention

The present invention relates to machine tools in general.

More particularly, the invention relates to an arrangement for machining portions of a workpiece, such as e.g. a crankshaft, which are offset from the main axis of the workpiece and are also angularly offset with reference to one another.

2. The Prior Art

Machine tools are known for machining e.g. grinding or turning portions such as pins or trunnions of a larger workpiece, if these portions are arranged centrically with reference to the main workpiece axis. This is a relatively simple undertaking.

The operations become more difficult if the portions to be machined are offset from the main workpiece axis and are, in addition, angularly offset with reference to one another, as is the case with e.g. the crankpins of a crankshaft. The machine tool then requires equipment which is capable of positioning at least the particular portion to be machined so that it can move in a circular rotary path, rather than in an orbital path which it would normally assume when the overall workpiece is rotated. In addition, the workpiece must be readjusted and clamped each and every time a different one of these offset portions is to be machined; what is more, the portion must be located at an exactly prescribed angle relative to the machine. All of this is much too complicated to permit series operation, i.e. to permit large scale machining of identical workpieces.

It has been proposed to overcome these difficulties by providing machine tools with devices which can move the offset workpiece portions to a centric position for machining purposes. Another proposal is for equipment capable of making the portions assume the required angular position without having to release, reposition and reclamp the entire workpiece. Although these proposals constitute without doubt an improvement over the preceding state of the art, they are nevertheless far from satisfactory. This is especially true if the machine tool is to be used for the series-manufactured of a specific workpiece, i.e. for an operation in which the same operations must be repeated again and again with great accuracy. To make such operations economically feasible they must be capable of being largely automated which was not possible with the prior equipment.

SUMMARY OF THE INVENTION

It is, accordingly, an object of the present invention to overcome the disadvantages of the prior art.

A more particular object of the invention is to provide a machine tool device which permits the machining of workpiece portions which are offset (eccentric) relative to the main workpiece axis and which are also angularly offset relative to one another, without being possessed of the prior-art problems.

Still another object is to provide a device of the type under discussion which permits the machining of the aforementioned workpiece portions in a simple manner, without requiring repeated reclamping of the workpiece, and without separate drives for performing necessary motions. Moreover, repetitive required adjustments are to be effected automatically, i.e. without requiring the aid or even the attention of an operator.

A concomitant object is to provide such a device which permits maximum indexing where angularly offset workpiece portions are to be machined.

Yet an additional object is to provide a device of the type under discussion which is relatively simple and which therefore is economical to construct and reliable in operation.

In keeping with these objects and with still others which will become apparent as the description proceeds, one aspect of the invention resides in a machine tool of the type including at least one headstock and one tailstock and two clamping heads each coupled with one of said stocks for holding and rotating a workpiece which has a longitudinal axis and portions to be machined which are transversely offset from said longitudinal axis and also offset angularly relative to one another. According to the invention the tool includes a combination of at least one indexing head intermediate the headstock and the one clamping head coupled therewith, the indexing head being connected with the one clamping head for rotation about an axis of rotation of the headstock; first means on the indexing head for displacement of the same transversely of the axis of rotation by a distance corresponding to the respective transverse offset; and second means for selectively indexing the indexing head irrespective whether the one clamping head is rotating or stationary.

The novel features which are considered as characteristic for the invention are set forth in the appended claims. Both the construction and method of operation of the invention, as well as additional objects and advantages thereof, will however be best understood from the following description of specific embodiments in connection with the accompanying drawings.

DESCRIPTION OF PREFERRED EMBODIMENTS

Figure 1:
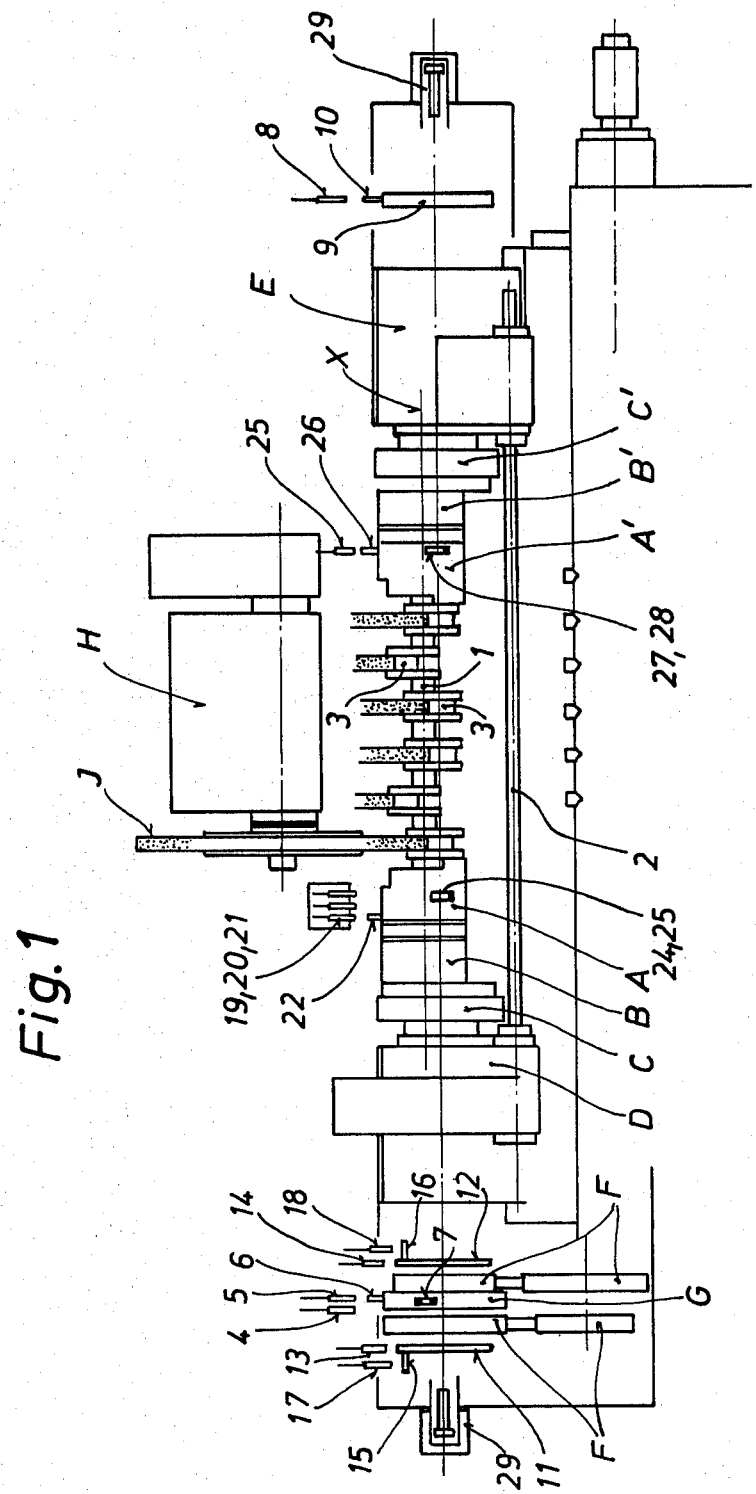
FIG. 1 is a somewhat diagrammatic front view illustrating a machine tool embodying the present invention.

In considering the several Figures it should be borne in mind that, in order to avoid making the drawing too complex and difficult to understand, only those elements which are needed for an understanding of the invention are described and provided with reference numerals.

Referring now firstly to FIG. 1 it will be seen that this shows a multi-throw crankshaft 1 as the workpiece to be machined. The crankshaft 1 is firmly mounted in two clamping heads A, A' of the machine tool, so that its crank pins can be machined. The head A which is adjacent the headstock D, is connected to an indexing head B having a radial stroke adjusting device C. A similar arrangement is provided adjacent the tailstock E, where the head A' is connected to an indexing head B' having another radial stroke adjusting device C'. A shaft 2 connects the headstock D with the tailstock E for synchronous operation. Beyond the headstock D the machine has an indexing head drive F with a device G for effecting a "top dead-center" setting. A tool headstock H is mounted above the workpiece (i.e. crankshaft 1) for displacement in direction axially of the machine; it carries, in the illustrated embodiment, a grinding wheel J for grinding the individual crank pins 3 of the crankshaft 1. The purpose of the device G is to be able to accurately place the entire system in the illustrated "top dead-center" position, because it is only in this position that the crankshaft 1 can be properly placed into (or removed from) and secured by the clamping heads A, A'. Setting of the system to this position is achieved by cooperation of projections 6, 7 on the device G with appropriately positioned non-contact (proximity) switches which are known per se in the art. In preparation for setting the system to the "top dead-center" position the number of revolutions of the crankshaft is automatically reduced via a ramp (known per se and not a part of the invention). After a predetermined reduced number of revolutions is reached, passage of the projection 7 by the switch 4 causes the rotation of the crankshaft to be reduced further to creep speed until the projection 6 reaches the switch 5 which then shuts down the drive. At this time the system is in the exact "top dead-center" position and a brake (known per se) is activated to hold it there.

It is, of course, important that the exact "top dead-center" position be reached at the tailstock E as well as at the headstock D, before other machine functions (e.g. grinding) are initiated. To assure that this requirement is met an indexing disk 9 which turns with the crankshaft 1, has a projection (not shown) which cooperates with another non-contact (proximity) switch 8. The "top dead-center" position has been properly reached when the signal which is issued by the switch 8 at the time the projection of disk 9 is located opposite it, coincides with the signal issued by the switch 5. The machine is now ready for the wheel J to grind those of the crank pins which are in proper grinding position; this operation, and the instrumentalities for effecting it, form no part of the invention since they are entirely known per se.

Once the grinding of the properly positioned crank pins 3 is completed and the tool stock H, grinding wheel J, the support and the workpiece sensor have reached their rear end position, an indexing command is electronically given to place the next crank pin or pins in position for grinding. This indexing is effected during turning of the crankshaft 1, via the drive F and the indexing heads B, B' (to be described in detail later on). To avoid indexing errors, the drive F includes counting wheels 11, 12 which cooperate with proximity switches 13, 14; the latter supply signals to an electronic circuit which preselects the indexing angles. In addition, the wheels 11, 12 are provided with projections 15, 16 which cooperate with proximity switches 17, 18 to enable the electronic circuit to detect the relative angular position of a hollow spindle 32 and a hollow shaft 46 (both to be described later on). It should be noted that the electronic circuit is not a part of the present invention and is mentioned herein only for a better understanding of the inventive functions.

After indexing, and during the following rotation, a check is electronically made to assure the correct execution of the indexing function. This is done by cooperation of one of three proximity switches 19, 20, 21 with one of three projections 22, 23, 24 on the clamping head A, as well as switch 5 and cooperating projection 6 of drive F. Rotation of the crankshaft 1 by the head A causes the head A' to be entrained; it is therefore advisable to run the same electronic check at the side of the head A' also, since the crankshaft might have slipped during the indexing. Accordingly, a switch 25 and three projections 26, 27, 28 on head A', as well as switch 8 and projection 10, run the check. When both checks are positive, the next-following operating functions are automatically triggered.

Figure 2:
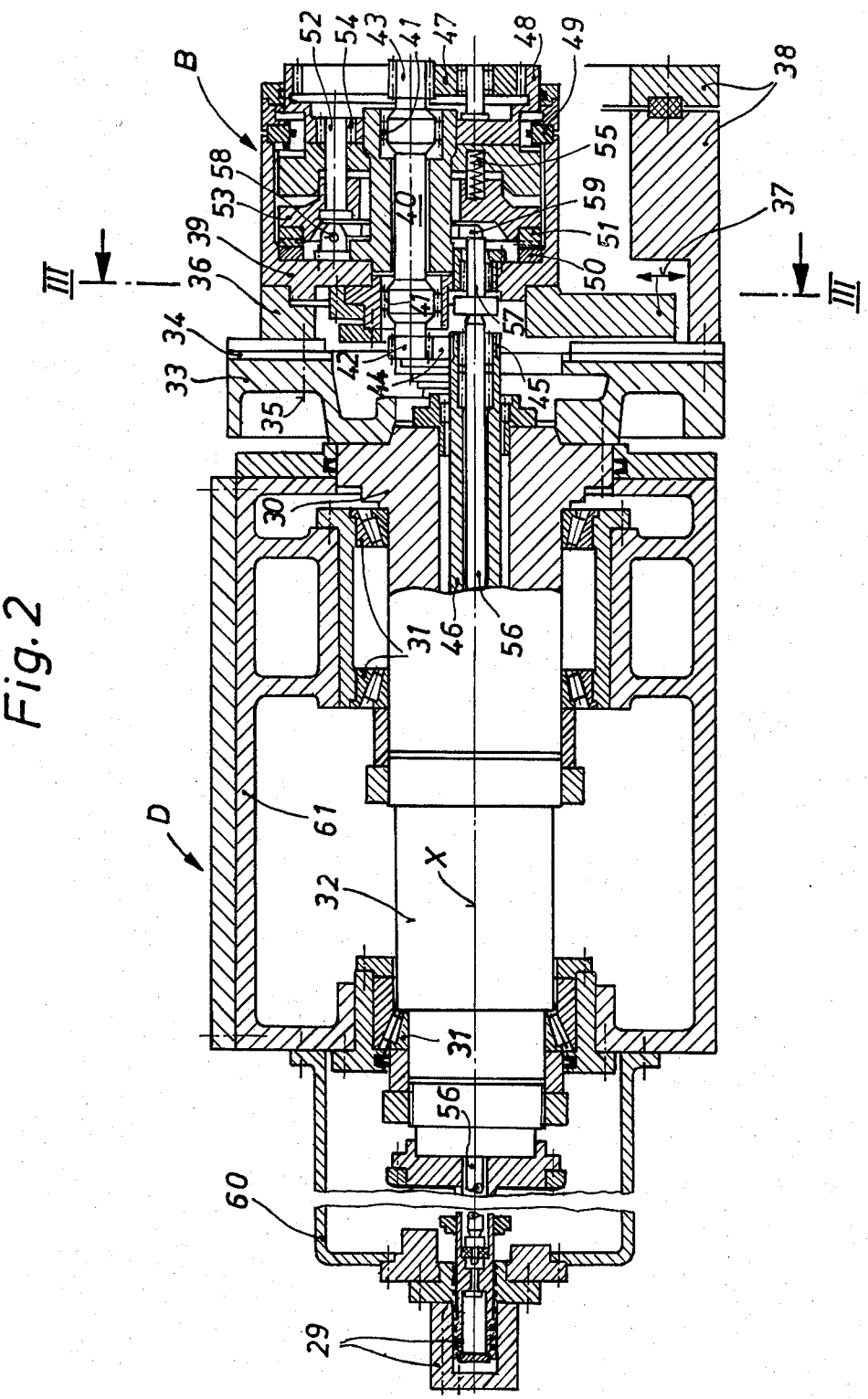
FIG. 2 is a longitudinal section through the indexing head and stroke adjustment device of the apparatus in FIG. 1.

Turning now to FIG. 2 it will be seen that the previously mentioned hollow spindle 32 is the main drive spindle; it is journalled in the headstock housing 61 via precision bearings 31. Spindle 32 has a head 30 to which a face plate 33 is secured. The free endface of plate 33 is provided with plane surfaces or with grooves 34 which are elongated in direction normal to the longitudinal axis X of the spindle 32. A plate 36 is secured at the free endface of plate 33 by screws 35; when the screws are loosened, the plate 36 can be shifted along the grooves 34 in direction of the arrow 37. This permits the selection of the degree of displacement of a crankpin 3 to be machined (see FIG. 1) with reference to the main longitudinal axis of the crankshaft 1. Counterweights 38 are fixedly secured to the plate 33 for purposes of mechanical balance.

A cylindrical housing 39 is centrally mounted on the plate 36 and a shaft 40 is in turn centrally journalled in this housing by means of bearings 41. The opposite ends of shaft 40 are configurated as spur gears 42, 43 of which the former meshes with an intermediate gear 44 which in turn engages a gear 45 mounted on an end portion of the previously mentioned hollow shaft 46. The shaft 46 is journalled in the hollow spindle 32 and constitutes the connection between indexing head B and drive F (to be described later). The gear 43 also meshes with an intermediate gear 47 which in turn engages in an internal ring gear 48 which is mounted via a precision-built combined radial-and-axial bearing 49 in the housing 39. The housing 39 must, of course, be constructed to be able to absorb all forces which occur in operation of the ring gear 48 which constitutes the output member of the indexing head B as well as the base for connection of the clamping head A.

Also located in the housing 39 are two cooperating disks 50, 51 having juxtaposed surfaces which are each provided with a concentric annulus of teeth (not separately shown). The teeth of the two disks interdigitate to connect the disks. They must be produced with considerable precision since they constitute the basis for the indexing accuracy of the entire device. Each annulus preferably is composed of 120 teeth so as to obtain indexing steps having a magnitude of e.g. 2, 3, 4, 5, 6, 8, 10 and 12, i.e. those which are most common in the machining of a crankshaft. Self-evidently, indexing magnitudes in the twenties, thirties, forties and sixties are also possible with these disks. In fact, only special indexing divisions such as e.g. 7 and 9, require the use of specially prepared disks 50, 51.

Disk 50 is directly mounted in the housing 39. Disk 51, on the other hand, is mounted with prestress via several bolts 52 which are press-mounted in a disk 53 and ball-guide bushings 54 which are press-mounted in the body of the gear 48. This construction permits an interlocking connection of the gear 48 with the housing via disks 50, 51 in the desired indexing position, but also enables the connection between the gear 48 and housing 39 to be disengaged for indexing purposes. To maintain the teeth of the disks 50, 51 normally in mesh, several springs 55 (here helical springs) are provided between gear 48 and disk 53 which urge the disks 50, 51 towards one another and the gears on their juxtaposed faces into interdigitating engagement. The machining (e.g. grinding) of the crank pins 3 is carried out with the teeth of the disks 50, 51 thus interengaged.

When indexing is to be effected on completion of the machining of the crank pin or pins which were originally in proper machining position, the disk 51 is moved out of engagement with the disk 50 counter to the force exerted by the springs 55. For this purpose a pushrod 56 is slidably accomodated in the hollow shaft, a separate bolt 57 is shiftably located in the housing 39 and can be shifted by the pushrod 56. A lever 59 is pivoted in the housing at 58 and centrally bears upon the disk 53; the lever pivots about pivot 58 and presses against disk 53 to move disk 51 away from disk 50. The desired angular displacement (i.e. indexing) can now be carried out via the drive F (still to be described), the shaft 46, the gears 45, 44, 42, 43, 47 and the gear 48 to which head A is connected. Actuation of the pushrod 56 to effect disengagement of the disk 51 from disk 50 may be effected in various ways, for example by means of a hydraulic drive 29 which is mounted to the illustrated housing 60. On completion of the indexing operation the hydraulic drive 29 is turned off so that its pressure medium (preferably oil) can escape and no longer resists the bias of the springs 55 which push the disk 53, bolt 57 and pushrod 56 back to their respective starting positions, whereby the teeth of disks 50, 51 interengage again.

Figure 3:
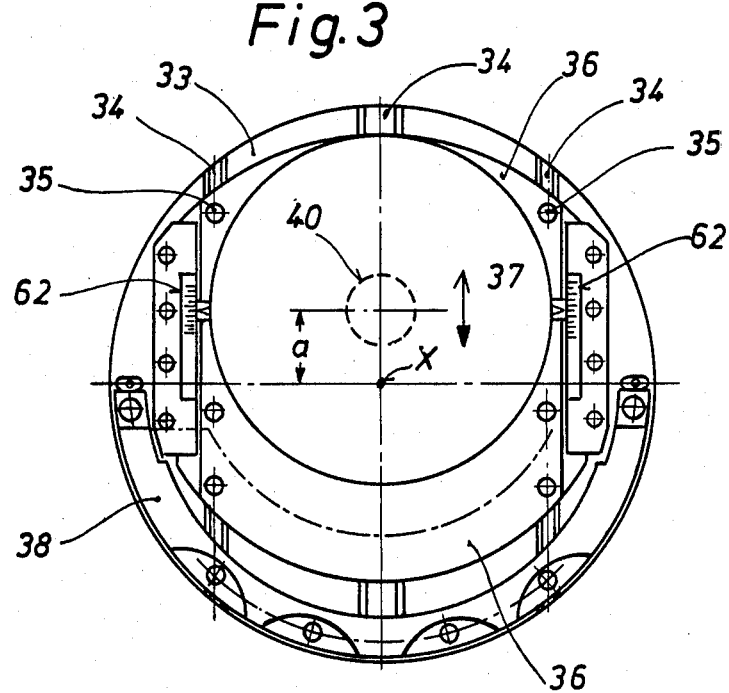
FIG. 3 is a simplified section taken on line III—III of FIG. 2, illustrating the stroke adjustment principle but omitting all other components for clarity.

The offset A of the shaft 40 relating to the longitudinal axis x of the hollow spindle 32 is clearly shown in FIG. 3. It will be appreciated that after the screws 35 are backed off the plate 36 can be shifted along the grooves 34 (or analogous planar elongated faces) in the direction of arrow 37 by a distance corresponding to the spacing between the longitudinal axis of the respective crank pin 3 and the main longitudinal axis of the crankshaft 1. In the selected position the plate 36 is then fixed by tightenting of the screws 35. Indicators 62 may be provided to facilitate the setting operation.

Figure 4:
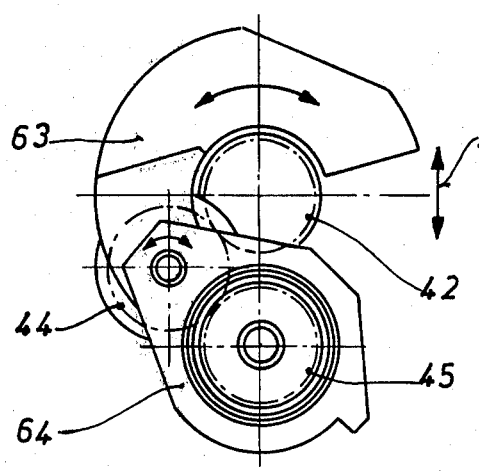
FIG. 4 is a side view, showing the drive components required for the stroke adjustment feature.

Gear 45 is formed internally of the hollow shaft 46 as shown in FIG. 4, which also shows gear 42 mounted on shaft 40 (cf FIG. 2) and intermediate gear 44 mounted on a flange or support member 63. A connecting member 64 assures that the gears 44, 45 are always maintained at a predetermined spacing so that the gears 45, 44 and 42 always remain in mesh even though the shaft 40 is displaced by plate 36 with reference to the main longitudinal workpiece axis x. One problem that cannot be avoided with this embodiment is a slight turning movement of the gear and shaft 46 in response to such displacement. To avoid resultant indexing errors this turning movement must be compensated by releasing the switches 13, 17 (cf FIG. 1), moving them in the direction of, and by a distance corresponding to, the turning movement and then arresting them again in their new positions.

Figure 5:
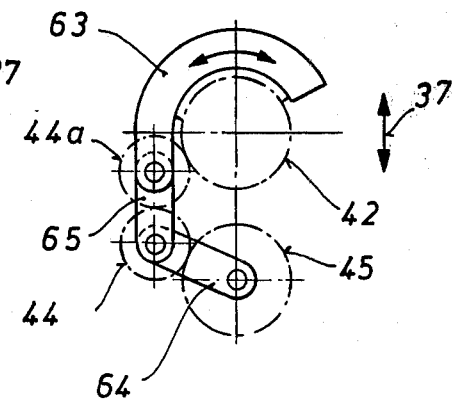
FIG. 5 is a view analogous to FIG. 4 but illustrating a variant of the embodiment in that Figure.

These readjustments are best avoided, if possible, and the embodiment of FIG. 5 offers just such a possibility. In this embodiment, the gear 45 is coupled in motion-transmitting relationship with gear 42 via two intermediate gears 44, 44a. One of these, the gear 44, is mounted on an analogous flange 63 as before. Connecting member 65 maintains gears 44, 44a in permanent mesh with one another; a connecting member 64 performs the same function relative to gears 44a, 45. It will be appreciated that in this embodiment a displacement of shaft 40 relative to the axis x does not cause any rotation of gear 45 so that readjustments of the switches 13, 17 are unnecessary. The embodiment of FIG. 5 is therefore currently preferred over that of FIG. 4 except that, as the FIG. 5 embodiment requires somewhat more room, a lack of space availability might mandate use of the FIG. 4 embodiment.

Figure 6:
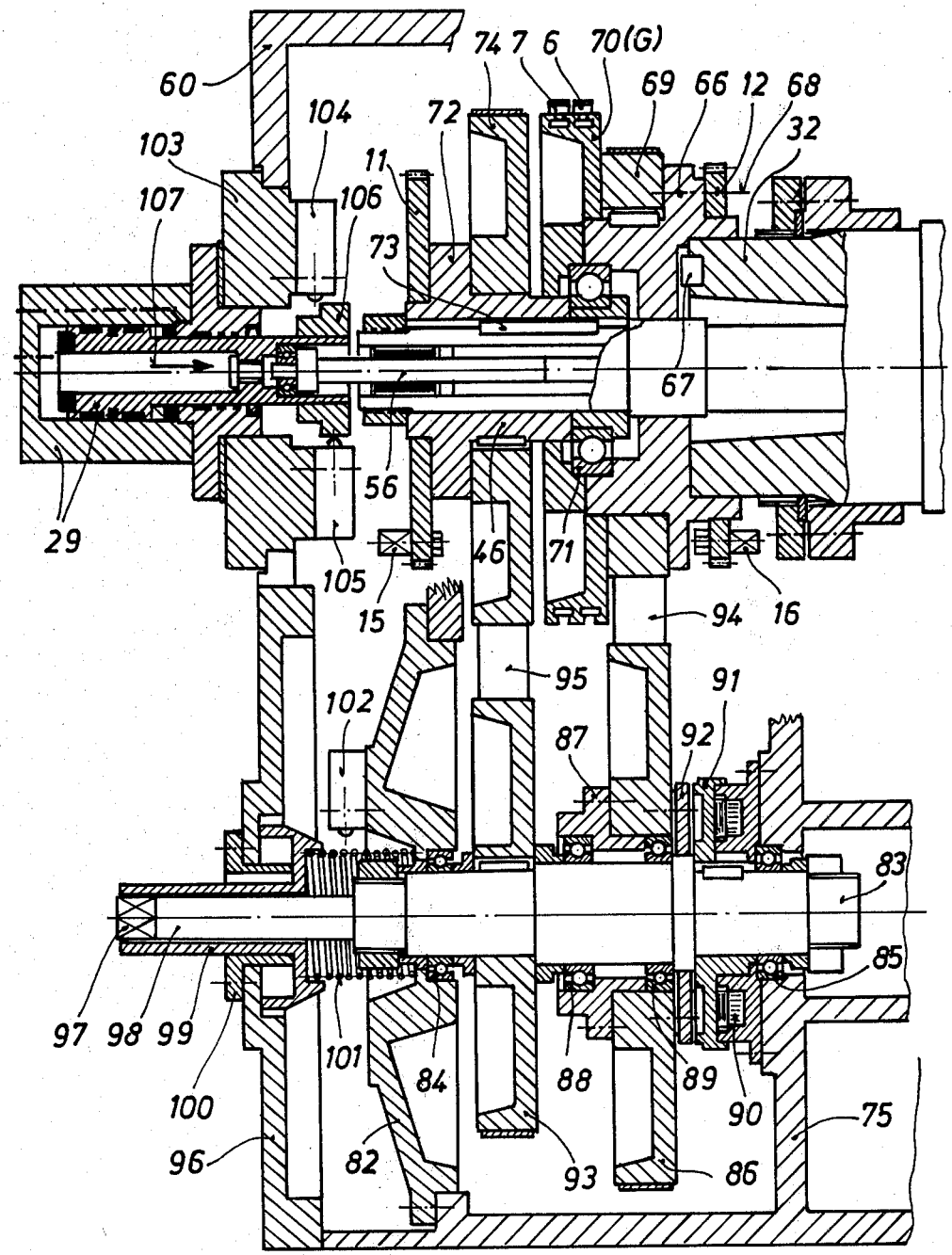
FIG. 6 is a longitudinal section of the drive for the indexing head in FIG. 2, as seen from above.

The indexing head drive F is shown in detail in FIG. 6 from which it will be noted that the drive is partly accomodated in housing 60 but projects laterally from the same to some extent. A flange 66 is secured to the free end of hollow spindle 32 by means of (diagrammatically shown) screws 68. A driver 67 fixes the flange in its precise required position. A sprocket 69—with preferably eighty teeth—for a toothed belt, a cam disk 70 with the cams 6, 7 on its periphery, and an adjustable toothed counting wheel 12—preferably with 120 teeth—are mounted on the flange 66. Laterally on the wheel 12, radially spaced as far as possible, the wheel 12 is provided with a single reference cam. At the center of flange 66 the shaft 46 is journalled radially and axially in both directions in a bearing 71.

Another flange 72 is mounted on the hollow shaft 46 and prevented against angular displacement relative thereto by a spline or key 73. The flange 72 also has several elements mounted on it, namely a counting wheel 11 similar to wheel 12 and having a single reference cam 15, and a toothed-belt sprocket 74 with preferably one hundred teeth.

An auxiliary shaft 83 is journalled in bearings 84, 85 which are installed in a housing 75 and cover 82, respectively; shaft 83 extends parallel to spindle 32 and shaft 46. A sprocket 86—preferably with one hundred teeth—is rigidly connected with a flange 87 and both are mounted freely rotatably on shaft 83 via bearings 88, 89. The sprocket 86 is transversely aligned with sprocket 69. An operating (excitation) winding of an electromagnetic coupling is mounted on the housing 75 between the sprocket 86 and the housing wall. An entraining wheel 91 is mounted on shaft 83 for rotation with, but not relative to, the same, and an annular disk 92 is secured to sprocket 86 and constitutes the armature of the electro-magnetic coupling. Yet another sprocket 93—this one with preferably eighty teeth—is also mounted on the shaft 83 to be transversely aligned with the sprocket 74 and rotate with the shaft 83. A toothed(-timing) belt 94 connects the sprockets 69, 89 with one another and a similar belt 95 connects the sprockets 74, 93.

That end portion 98 of shaft 83 which faces away from the head B extends outwardly through a cover 96 of housing 75; it may but need not be, of quadratic cross-section as shown at 97. A slidable sleeve 99 surrounds the portions 97 or 98 respectively; it is guided for movement in a flange 100 mounted on cover 96. A helical spring 101 reacts against the sleeve 99 and the cover 82 and permanently urges the sleeve 99 outwardly to a position covering the portion 97. A limit switch 102 (known per se) is mounted on the cover 82.

To facilitate understanding, it should be noted that cam wheel 70 mentioned above constitutes the "top dead-center" setting device G of FIG. 1, and that sprockets 69, 86, 74 and 93 with their associated belts constitute the indexing head drive F.

Housing 60 surrounds the hollow spindle 32, the hollow shaft 46 and their associated elements. It has a cover 103 mounted thereon and, in turn, the cover 103 has mounted on it the hydraulic drive 29 (e.g. a single-acting cylinder-and-piston unit) and two limit switches 104, 105 (known per se) which cooperate with an actuating member 106 mounted on the drive 29 or, as here, on the rod 56 for movement with the same. The limit switches are somewhat offset relative to one another along the path of movement of the member 106.

The operation is as follows:

While the crank pin 3 of the crankshaft 1 (or of another workpiece) is being machined, the hollow spindle 32 and the hollow shaft 46 rotate in synchronism, i.e. at identical RPM. When the time comes for indexing the drive 29 is actuated and shifts the rod 56 in the direction of arrow 107 (FIG. 6). When the drive 29 is not actuated this is detected by limit switch 104 sensing that member 106 is in left-hand position; when the drive 29 is actuated the fact that member 106 is now in the right-hand position is detected by limit switch 105. The switches produce respective signals which are supplied to and processed by the electronic machine control (not a part of the invention). Activation of drive 29 and movement of pushrod 56 in direction of the arrow 107, effects disengagement of spindle 32 and shaft 46 in the manner described earlier. At the same time the winding 90 of the electromagnetic coupling is energized so that the sprocket 86 is now coupled for rotation with shaft 83. Accordingly, the sprocket 69 now drives the hollow shaft 46 in rotation, via belt 14, sprocket 86, shaft 83 and sprocket 74. Since the spindle 32 also rotates, and since the shaft 46 rotates at a lesser speed than the spindle 32 due to the interposed step-down transmission, a relative angular (circumferential) movement between hollow spindle 32 and hollow shaft 46 results.

This relative movement continues until the desired index setting is reached, at which time the supply of electrical energy to the electro-magnetic coupling is terminated and the hydraulic drive deactivated (i.e. connected to the not-illustrated reservoir). The spring 55 can now expand and, in doing so, return the pushrod to its starting position. This results in re-engagement of the teeth on disks 50, 51 and machining of the new crank pin (or pins) 3 which has just been moved to proper position, can now commence. Whether the indexing operation has been carried out, and whether it has been properly completed, is supervised by the elements 11, 12 with their projections 15, 16 and the cooperating electronic circuit (not part of the invention), as described earlier.

Indexing will sometimes need to be carried out with the hollow spindle 32 being stationary; an example of this is the positioning of the workpiece at the beginning of the operation. For this purpose the arrangement is operated manually by first pushing sleeve 99 inwardly counter to spring 101 until it can move no farther, and then turning it through 90°. This causes the sleeve to be retained in the depressed position, exposes the portion 97 and results in actuation of the limit switch 102. The signal from the limit switch blocks the drive motor (not shown) of the hollow spindle 32 and causes the hydraulic drive to be actuated, so that the pushrod 56 shifts in direction of the arrow 107 and disconnects the disks 50, 51 from one another. A crank or other appropriate tool can now be applied to the portion 97 and used to turn hollow shaft 46 through a portion of arc via the belt transmission 93, 95 and 74. To re-establish the initial condition, the sleeve 99 is turned through 90° in the opposite direction from before and the spring 101 then returns to its starting position, allowing all other affected components to resume their own previous positions.

The invention is not limited to the machining of crankshafts. However, if it is used for this purpose, especially for the machining of large crankshafts, then it is important to employ two clamping heads A, A' and two indexing heads B, B' to avoid inaccuracies in operation. Only a single indexing head drive F is, however, needed for both of the heads B, B'; its function is electronically transmitted.

The invention is possessed of a number of considerable advantages by comparison with the known state of the art. For example, an unparalleled indexing accuracy is assured by the use of precision-manufactured disks 50, 51 with their large number of carefully produced teeth, and the arrangement permits a precise accomodation of the desired crankshaft throw. Indexing can be effected automatically, while the workpiece continues to rotate and without having to unclamp the workpiece at any time throughout the operation. Special drives are not required since the existing machine tool drive is fully adequate for all operations; this is true also of the indexing head drive which acts only to transmit motive power but does not require its own prime mover. Moreover, the machine can be properly accommodated to the requirements of a particular workpiece or series of workpieces, since indexing can be carried out mechanically as well as manually and index portions such as 2, 3, 4, 5, 6, 8, 10, 12, 20, 30, 40 and 60 can be freely selected without requiring the replacement of parts of any kind.

While the invention has been illustrated and described as embodied in an arrangement for machining portions of a workpiece, it is not intended to be limited to the details shown, since modifications and structural changes may be made without departing from the spirit of the invention.

What is claimed as new and desired to be protected by Letters Patent is set forth in the appended claims:

1. In a machine tool of the type including at least one headstock and one tailstock and two clamping heads each coupled with one of said stocks for holding and rotating a workpiece which has a longitudinal axis and portions to be machined which are transversely offset from said longitudinal axis and also offset angularly relative to one another, a combination comprising at least one indexing head intermediate the headstock and the one clamping head coupled therewith, said indexing head being connected with said one clamping head for rotation about an axis of rotation of said headstock;

first means on said indexing head for displacement of the same transversely of said axis of rotation by a distance corresponding to the respective transverse offset; and second means for selectively indexing said indexing head irrespective of whether said one clamping head is rotating or stationary.

2. A combination as defined in claim 1, said indexing head including two parallel interengageable disks, and means normally urging said disks into said interengagement.

3. A combination as defined in claim 2, said tailstock having an endportion facing away from said one clamping head; and further comprising an indexing head drive at said end portion and operative to initiate disengagement of said parts.

4. A combination as defined in claim 3; and further comprising third means for monitoring the indexing operation.

5. A combination as defined in claim 1; further comprising a hollow rotatable drive spindle for said one clamping head; said first means comprising a first disk mounted coaxially on a free end of said spindle and having an exposed major surface provided with transverse tracks extending normal to the axis of rotation of said spindle, a second disk on said indexing head having portions engaged with and slidable along said tracks; and means for arresting said second plate in selectable positions relative to said first plate.

6. A combination as defined in claim 5; and further comprising means for indicating the extent of displacement of said second disk transversely of said axis of rotation.

7. A combination as defined in claim 5, said indexing head comprising a substantially cylindrical housing mounted on said second disk and having an end portion remote from the same and adjacent to said one clamping head, an annular body mounted for rotation in said end portion but secured against axial displacement, and means connecting said annular body and said one clamping head; and wherein said second means comprises coupling elements rigidly engageable with one another for coupling said housing and annular body for joint rotation in any of a plurality of relatively offset annular index positions, and disengaging means for disengaging said coupling elements so as to permit indexing of said annular body.

8. A combination as defined in claim 7, said coupling portions comprising a first coupling disk connected to said housing and a second coupling disk, said disks having juxtaposed surfaces each provided with an annulus of teeth; further comprising means connecting said second disk to said annular body for axial displacement relative thereto and to said first disk; and biasing means urging said second disk towards said first disk for interengagement of the teeth of said annuli.

9. A combination as defined in claim 8, wherein each of said annuli has an even number of high-precision teeth.

10. A combination as defined in claim 8, wherein each of said annuli has 120 high-precision teeth.

11. A combination as defined in claim 8, said disks being replaceable with other similar disks having a different number of teeth per annulus.

12. A combination as defined in claim 8, said connecting means comprising a carrier on which said second coupling disk is mounted, bores in said annular body, bolts in said carrier and slidably received in said bores, said biasing means comprising spring means acting upon said carrier and urging the same towards said first disk.

13. A combination as defined in claim 12, said spring means reacting between said carrier and said annular body.

14. A combination as defined in claim 12, said annular body having an inner circumferential surface provided with an inner annulus of gear teeth; and further comprising a dual-directional axial bearing and a radial bearing mounting said annular body in said housing.

15. A combination as defined in claim 14, said second means further comprising gear train means meshing with said inner annulus of gear teeth and operative for effecting annular displacement of said annular body with reference to said housing.

16. A combination as defined in claim 15, said gear train means comprising a shaft journalled for rotation in said housing and having two end portions each provided with a terminal gear, an intermediate gear meshing with one of said terminal gears and with said inner annulus of gear teeth, and another intermediate gear meshing with the other terminal gear and with a drive gear.

17. A combination as defined in claim 16; further comprising a hollow shaft rotatably journalled in said hollow spindle and connecting said indexing head with a drive, said drive gear being mounted on said hollow shaft for rotation therewith.

18. A combination as defined in claim 17; further comprising a mounting member tiltable about said hollow shaft and carrying said another intermediate gear, and including means for maintaining said another intermediate gear in mesh with said drive gear in all tilted positions of said mounting member.

19. A combination as defined in claim 17; further comprising an additional gear interposed between and meshing with said other terminal gear and with said another intermediate gear, and a mounting member tiltable about said hollow shaft and carrying said another intermediate gear and including means for maintaining said other terminal gear, drive gear, another intermediate gear and additional gear in mesh in all tilted positions of said mounting member relative to said hollow shaft.

20. A combination as defined in claim 17, said disengaging means comprising a pushrod slidably received in said hollow shaft and having a portion extendable beyond the same, a pin slidably mounted in said housing and axially aligned with said pushrod, and a lever extending transverse to said pin and eccentrically pivoted with reference thereto, so that pushing of the pin against the lever due to sliding of the pushrod results in pushing of the lever against said carrier and consequent disengagement of said annuli of teeth from one another.

21. A combination as defined in claim 20; and further comprising pushing means for effecting sliding of said pushrod in direction toward said pin.

22. A combination as defined in claim 21, wherein said pushing means comprises a hydraulic drive.

23. A combination as defined in claim 21, said drive comprising a first belt sprocket on said spindle rotatable therewith and relative to said hollow shaft, a rotatable auxiliary shaft extending parallel to said spindle and hollow shaft, a second belt sprocket journalled on said auxiliary shaft for rotation relative thereto, and a toothed belt connecting said belt sprockets in motion-transmitting relationship.

24. A combination as defined in claim 23, said first belt sprocket having eighty teeth and said second belt sprocket having one hundred teeth.

25. A combination as defined in claim 23; and further comprising electro-magnetic coupling means operative for connecting said second belt sprocket with said auxiliary shaft for joint rotation with the same for the duration of indexing.

26. A combination as defined in claim 25, said electro-magnetic coupling means comprising an annular armature connected to said second belt sprocket, an annular coupling element mounted on said auxiliary shaft for rotation therewith, and an electrically energizable winding for electro-magnetically coupling said armature and coupling element together for joint rotation.

27. A combination as defined in claim 26; further comprising a third and a fourth belt sprocket respectively mounted on said auxiliary shaft and on said hollow shaft for rotation therewith; and an additional toothed belt connecting said third and fourth belt sprockets in motion-transmitting relationship.

28. A combination as defined in claim 27, said third belt sprocket having eighty teeth and said fourth belt sprocket having one hundred teeth.

29. A combination as defined in claim 27, said pushing means and said electro-magnetic coupling means being simultaneously activatable and de-activatable to permit automated indexing.

30. A combination as defined in claim 27, said housing of said indexing means having a cover and said auxiliary shaft having a shaft portion extending outwardly through said cover and provided with a tool-engageable formation; further comprising a sleeve journalled in said cover for axial sliding movement to and from a position in which it surrounds and covers said formation; and biasing means biasing said sleeve to said position.

31. A combination as defined in claim 30, said sleeve being slidable from said position in direction inwardly of said housing and being lockable in response to turning through a portion of arc; and further comprising means for sensing when said sleeve is locked and in response thereto disengaging the machine tool drive and activating said pushing means so as to permit manual indexing.

32. A combination as defined in claim 1; further comprising an additional indexing head, each of said indexing heads being coupled with a different one of said clamping heads; and a single indexing-head drive operatively connected with said indexing heads.

* * * * *